United States Patent [19]
Zhang et al.

[11] Patent Number: 5,635,982
[45] Date of Patent: Jun. 3, 1997

[54] SYSTEM FOR AUTOMATIC VIDEO SEGMENTATION AND KEY FRAME EXTRACTION FOR VIDEO SEQUENCES HAVING BOTH SHARP AND GRADUAL TRANSITIONS

[76] Inventors: Hong J. Zhang, Block 1E Gillman Heights #13-41, Singapore, Singapore, 0410; Jian H. Wu, Block 15 Ghim Moh Road #06-33; Stephen W. Smoliar, 90 Jalan Hitam Manis, both of Singapore, Singapore, 1027

[21] Appl. No.: 266,216

[22] Filed: Jun. 27, 1994

[51] Int. Cl.$^6$ .................................. H04N 5/76
[52] U.S. Cl. ............................ 348/231; 348/222
[58] Field of Search ........................ 348/422, 231; 364/419.08; 358/906, 909.1; 382/171, 173; H04N 5/76, 5/91

Primary Examiner—Victor R. Kostak
Assistant Examiner—John W. Miller
Attorney, Agent, or Firm—Lawrence Y. D. Ho; Raymond Sun

[57] ABSTRACT

An automatic video content parser for parsing video shots such that they are represented in their native media and retrievable based on their visual contents. This system provides methods for temporal segmentation of video sequences into individual camera shots using a novel twin-comparison method. The method is capable of detecting both camera shots implemented by sharp break and gradual transitions implemented by special editing techniques, including dissolve, wipe, fade-in and fade-out; and content-based key frame selection of individual shots by analyzing the temporal variation of video content and selecting a key frame once the difference of content between the current frame and a preceding selected key frame exceeds a set of preselected thresholds.

29 Claims, 14 Drawing Sheets

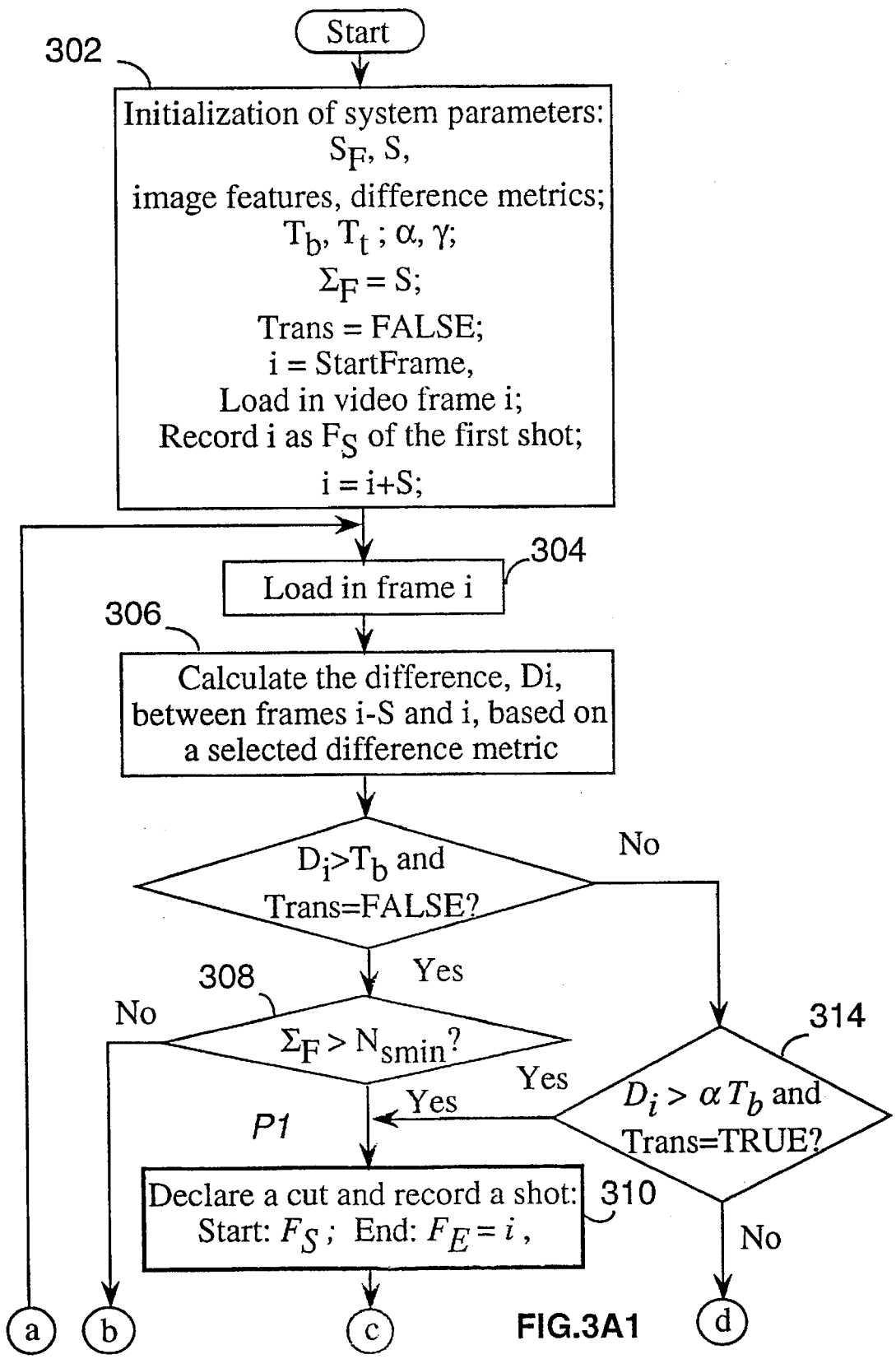
FIG.3A1

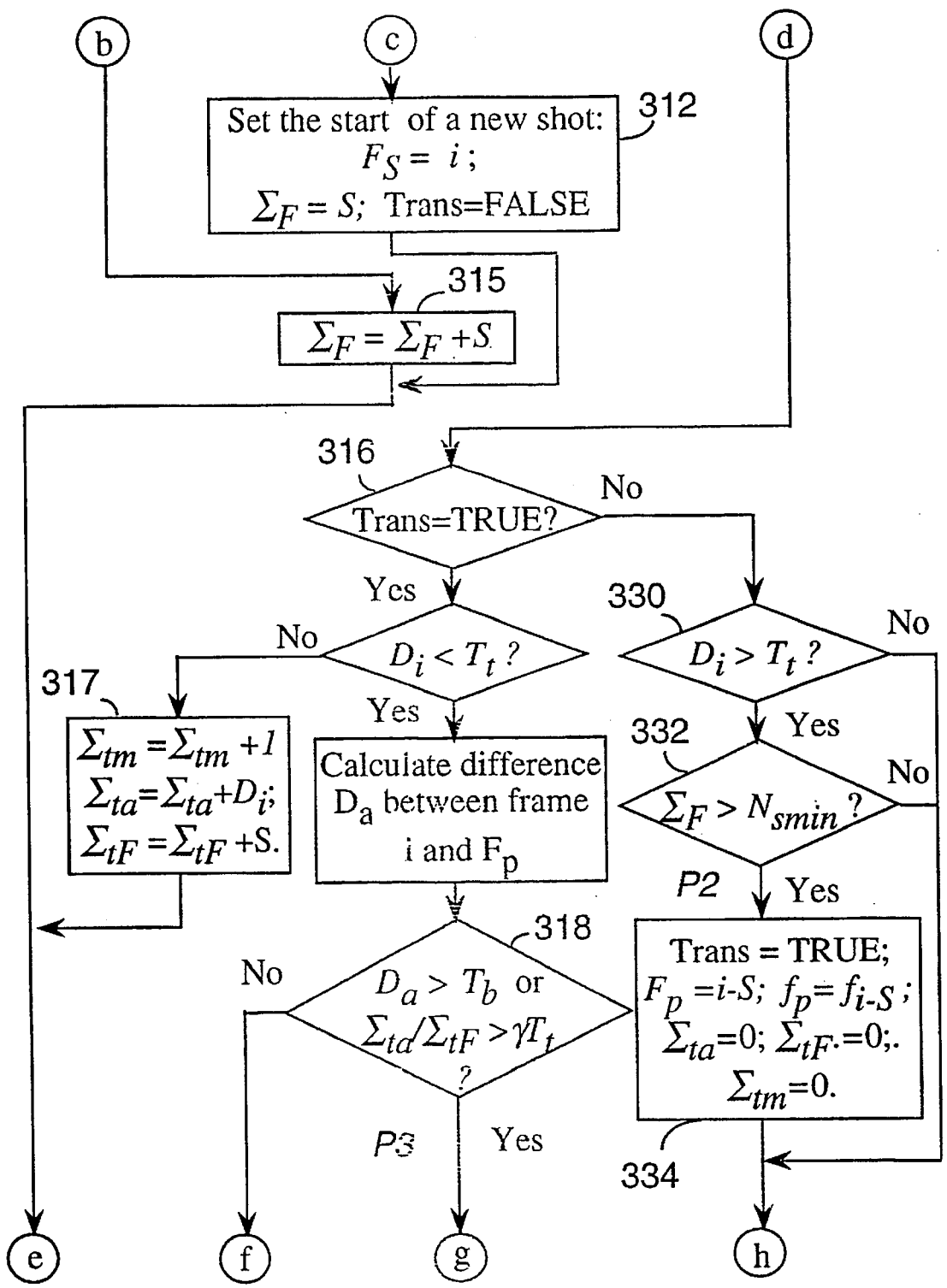
FIG.3A2

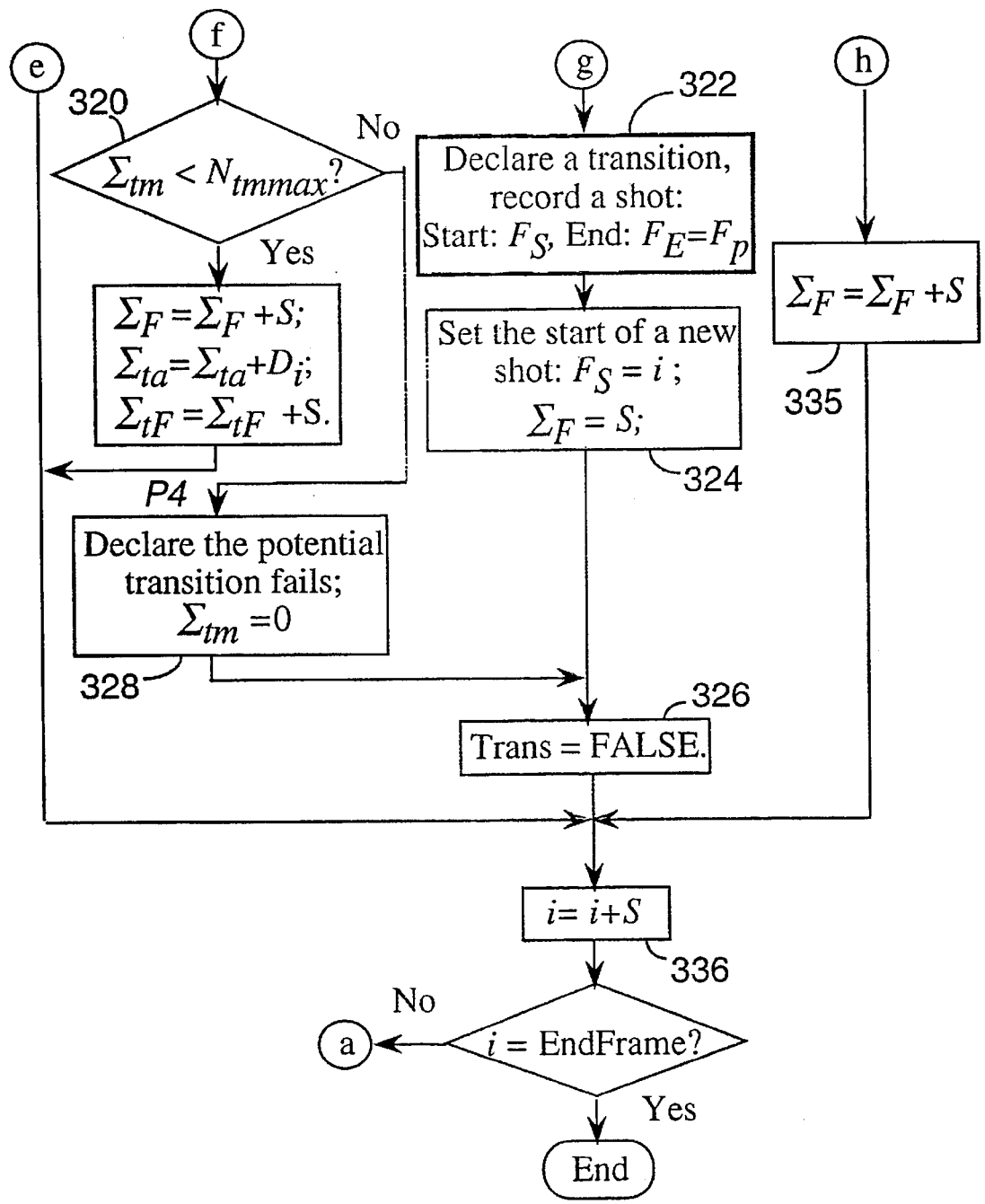
FIG.3A3

SYSTEM FOR AUTOMATIC VIDEO SEGMENTATION AND KEY FRAME EXTRACTION FOR VIDEO SEQUENCES HAVING BOTH SHARP AND GRADUAL TRANSITIONS

BACKGROUND OF THE INVENTION

1. Field of the Invention

The present invention relates to video indexing, archiving, editing and production, and, more particularly, this invention teaches a system for parsing video content automatically.

2. Description of the Related Art

In today's information world, the importance of acquiring the right information quickly is an essential aspect we all face. Given so much information and databases to process, how we make full use of the technological advancement to our advantage is what this present invention is addressing. Information about many major aspects of the world, in many cases, can only be successfully managed when presented in a time-varying manner such as video sources. However, the effective use of video sources is seriously limited by a lack of viable systems that enable easy and effective organization and retrieval of information from these sources. Also, the time-dependent nature of video makes it a very difficult medium to manage. Much of the vast quantity of video containing valuable information remains unindexed. This is because indexing requires an operator to view the entire video package and to assign index means manually to each of its scenes. Obviously, this approach is not feasible considering the abundance of unindexed videos and the lack of sufficient manpower and time. Moreover, without an index, information retrieval from video requires an operator to view the source during a sequential scan, but this process is slow and unreliable, particularly when compared with analogous retrieval techniques based on text. Therefore, there is clearly a need to present a video package in very much the same way as a book with index structure and a table of content. Prior art teaches segmentation algorithm to detect sharp camera breaks, but no method detects gradual transitions implemented by special editing techniques including dissolve, wipe, fade-in and fade-out. Prior art such as "Automatic Video Indexing and Full-Video Search for Object Appearances," Proc. 2nd Working Conf. on Visual Databased Systems, Budapest, 1991, pp. 119–133 by A. Nagasaka and Y. Tanaka and "Video Handling Based on Structured Information for Hypermedia Systems," Proc. Int'l Conf. on Multimedia Information Systems, Singapore, 1991, pp. 333–344 by Y. Tonomura teach segment boundaries detection methods but they are only capable of detecting sharp camera breaks. Another important area of video indexing is to select a representative frame known as Key Frame. This selection process as taught by prior art is based on motion analysis of shots and is complicated and prone to noise.

SUMMARY OF THE INVENTION

It is therfore an object of the present invention to automate temporal segmentation (or partitioning) of video sequences into individual camera shots by distinguishing between sharp breaks and gradual transitions implemented by special effects. Such partition is the first step in video content indexing which is currently being carried out manually by an operator which is a time consuming, tedious and unreliable process.

It is another object of the present invention to provide content based key frame selection of individual shots for representing, indexing and retrieving of the shots in a multimedia manner.

Accordingly, the present invention describes an automatic video content parser for parsing video shots such that they are represented in their native media and retrievable based on their visual contents. This system provides methods for temporal segmentation of video sequences into individual camera shots using a twin-comparison method. This method detects both camera shots implemented by sharp break and gradual transitions implemented by special editing techniques, including dissolve, wipe, fade-in and fade-out. The system also provides content based key frame selection of individual shots by analysing the temporal variation of video content and selects a key frame once the difference of content between the current frame and a preceding selected key frame exceeds a set of preselected thresholds.

BRIEF DESCRIPTION OF THE DRAWINGS

FIG. 3a1 shows a flow chart for performing temporal segmentation capable of both detecting sharp cuts and gradual transitions implemented by special effects of the present invention.

FIG. 3A2 is a continuation of the flow chart in FIG. 3A1.

FIG. 3A3 is a continuation of the flow chart in FIG. 3A2.

DETAILED DESCRIPTION OF THE INVENTION

Figure 1A:
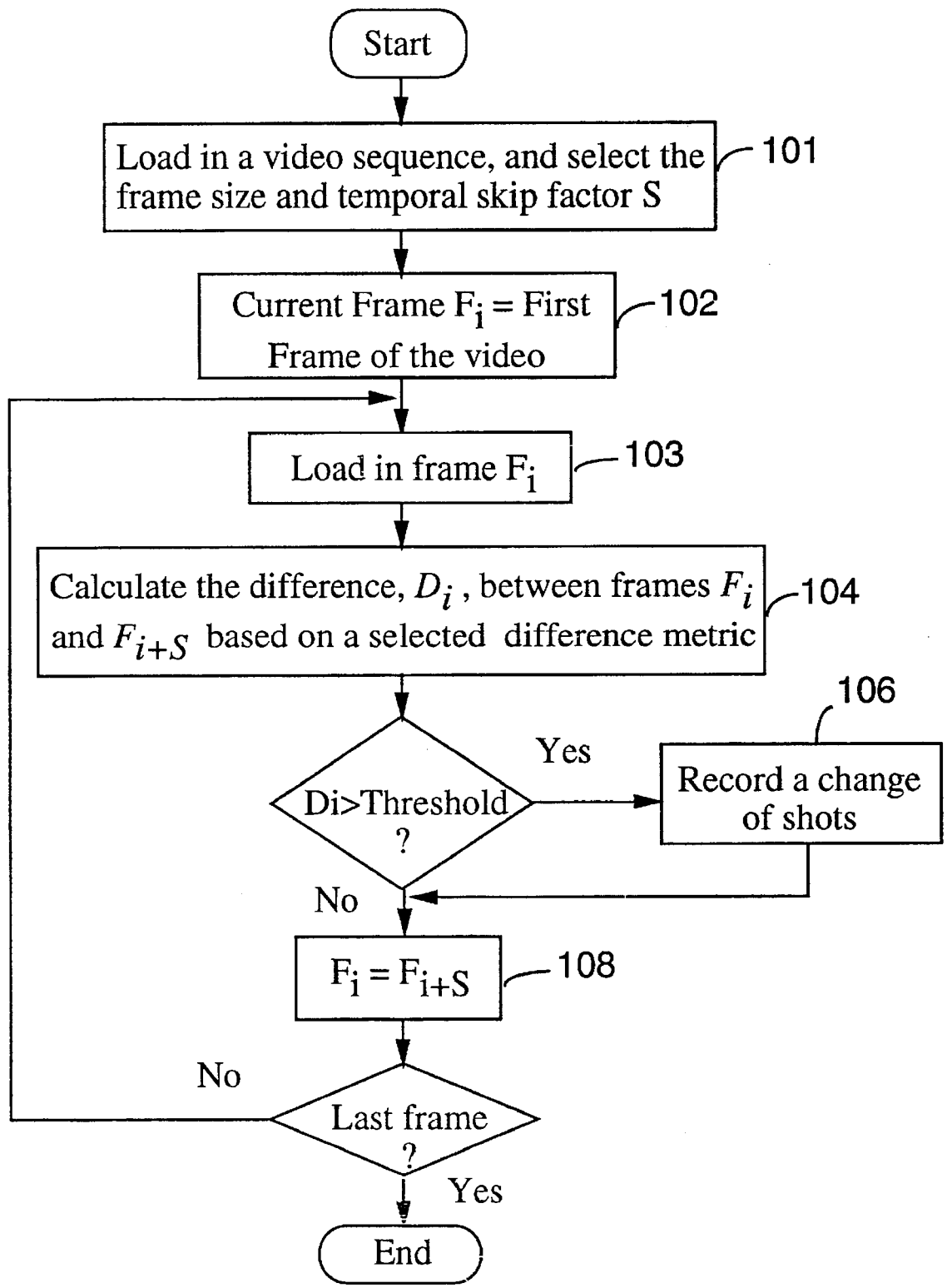
FIG. 1A shows a flow chart of a known video segmentation method.

Various terminologies are used in the description of this present invention. Accordingly, for better understanding of the invention, definitions for some of these terminologies are given as follows.

A "segment" or a "cut" is a single, uninterrupted camera shot, consisting of one or more frames.

A "transition" occurs when one moves from one segment to another in a video sequence. This could be implemented as a sharp break (occurs between two frames belonging to two different shots), or as special effects such as dissolve, wipe, fade-in and fade-out in which case, transition occurs across more than one frame.

"Temporal segmentation" or "scene change detection" of a video is to partition a given video sequence temporally into individual segments by finding the boundary positions between successive shots.

"Key frames" are those video frames which are extracted from a video segment to represent the content of the video or segment in video database. The number of key frames extracted from a video sequence is always smaller than the number of frames in the video sequence. Thus, a sequence of key frames is considered an abstraction of the video sequence from which they are extracted.

"Threshold" is a limiter used as a reference for checking to see whether a certain property has satisfied a certain criteria which is dictated by this limiter to define a boundary of a property. The value of threshold t, used in pair-wise comparison for judging whether a pixel or super-pixel has changed across successive frames is determined experimentally and it does not change significantly for different video sources. However, experiments have shown that the thresholds $T_b$ and $T_r$ used for determining a segment boundary using any of the difference metric (as defined below) vary from one video source to another.

"Difference metrics" are mathematical equations, or modifications thereof, adapted for analysing the properties of, in this case, video content. The different difference metrics include:

Pair-wise pixel comparison, whereby a pixel is judged as changed if the diference between the intensity values in the two frames exceed a given threshold t. This metric may be represented as a binary function $DP_i(k,l)$ over the domain of two-dimensional coordinates of pixels, (k,l), where the subscript i denotes the index of the frame being compared with its successor. If $P_i(k,l)$ denotes the intensity value of the pixel at coordinate (k,l) in frame i, then $DP_i(k,l)$ may be defined as:

$$DP_i(k,l) = \begin{cases} 1 & \text{if } |P_i(k,l) - P_{i+1}(k,l)| > t \\ 0 & \text{otherwise} \end{cases}$$

The pair-wise comparison algorithm simply counts the number of pixels changed from one frame to the next according to the above metric. A segment boundary is declared if more than a given percentage of the total number of pixels (given as a threshold T) has changed. Since the total number of pixels in a frame of dimension M by N is M*N, this condition may be represented by the following inequality:

$$\frac{\sum_{k,l=1}^{M,N} DP_i(k,l)}{M*N} * 100 > T$$

Likelihood ratio is a comparison of corresponding regions or blocks in two successive frames based on the second-order statistical characteristics of their intensity values. Let $m_i$ and $m_{i+1}$ denote the mean intensity values for a given region in two consecutive frames, and let $S_i$ and $S_{i+1}$ denote the corresponding variances and the ratio defined as:

$$\frac{\left[\frac{S_i + S_{i+1}}{2} + \left(\frac{m_i - m_{i+1}}{2}\right)^2\right]^2}{S_i * S_{i+1}} > t$$

A segment boundary is declared whenever the total number of sample areas whose likelihood ratio exceeds the threshold t is sufficiently large (where "sufficiently large" depends on how the frame is partitioned). This metric is more immune to small and slow object motion moving from frame to frame than the preceding difference metrics and is therefore less likely to be misinterpreted as camera breaks.

Histogram comparison is yet another algorithm that is less sensitive to object motion, since it ignores the spatial changes in a frame. Let $H_i(j)$ denote the histogram value for the ith frame, where j is one of the G possible pixel values. The overall difference $SD_i$ is given by:

$$SD_i = \sum_{j=1}^{G} |H_i(j) - H_{i+j}(j)|$$

A segment boundary is declared once $SD_i$ is greater than a given threshold T.

$\chi^2$—test is a modified version of above immediate equation which makes the histogram comparison reflect the difference between two frames more strongly.

$$SD_i = \sum_{j=1}^{G} \frac{|H_i(j) - H_{i+1}(j)|^2}{H_{i+j}(j)}$$

These above metrics may be implemented with different modifications to accommodate the idiosyncrasies of different video sources. Unlike the prior art, the video segmentation of the present invention does not limit itself to any particular difference metric and a single specified threshold. As such it is versatile.

Figure 1B:
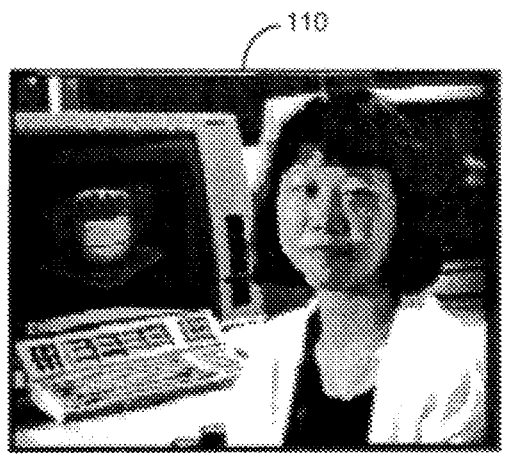
FIG. 1B shows an example of a typical sharp cut in a video sequence.
Figure 1B:
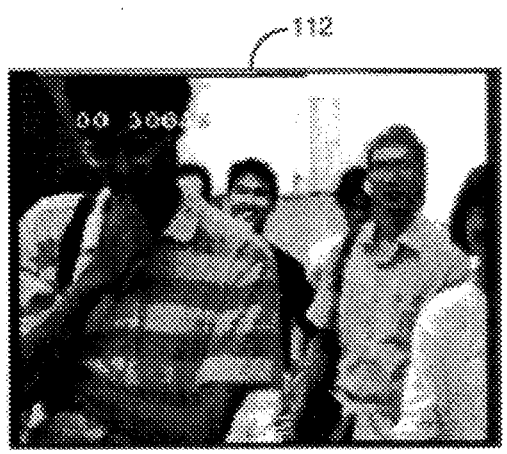

FIG. 1A shows a flow chart of known video segmentation method. This algorithm detects sharp cuts in video sequences. This is achieved by first, after initializing the standard system parameters at block 101, a first reference frame is selected at block 102, the difference, $D_i$, between frames $F_i$ and $F_{i+S}$ (which is a skip factor S away) is calculated based on a selected difference metric at block 104. If $D_i$ is greater than a preset threshold, a change of shot is detected and recorded at block 106 before proceeding to block 108. Otherwise, it proceeds directly to block 108 to establish a new frame. If it is the last frame, the segmentation process is completed; otherwise, it proceeds to block 103 to repeat the process until the last frame of the video sequence is reached. The output is a list of frame numbers and/or time codes of the starting and ending frames of each shot detected from the input video sequence. This method is only suitable for use in detecting sharp transition between camera shots in a video or film such as that depicted in FIG. 1B. The content between shot 110 and shot 112 is completely different from one another.

Figure 2:
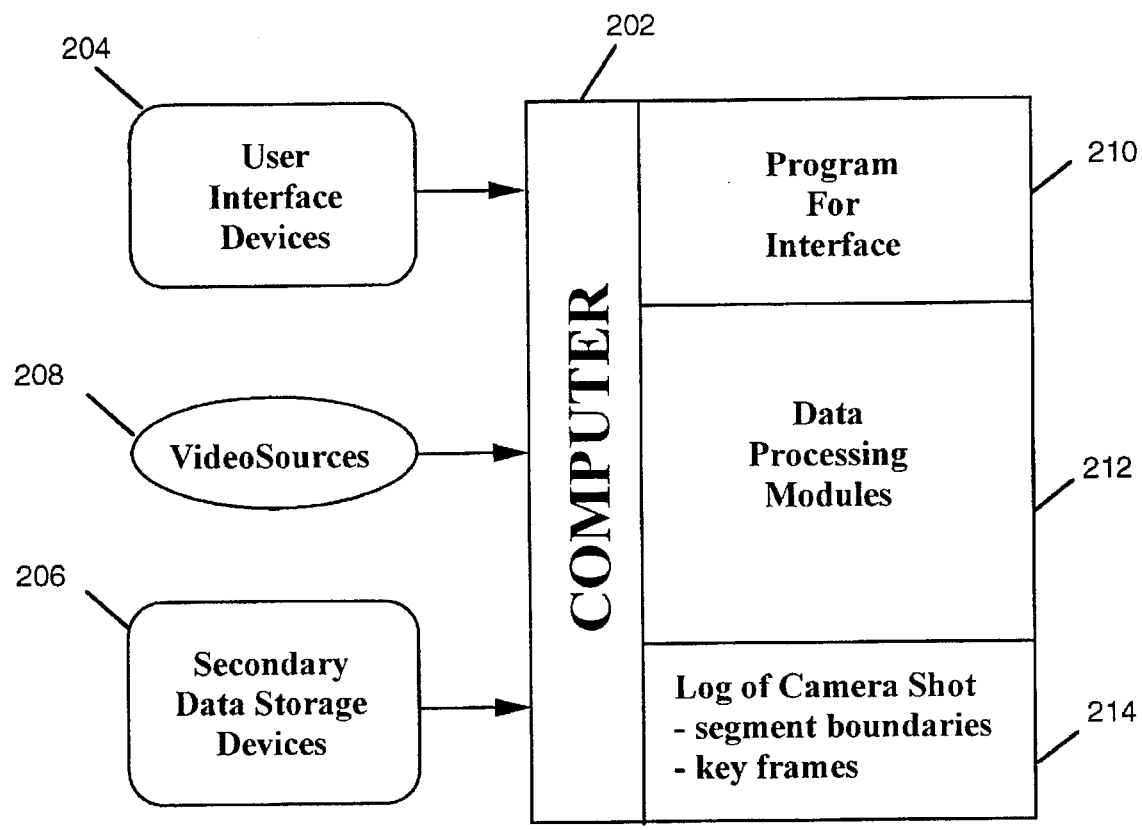
FIG. 2 is a block diagram showing an overview of a video content parsing system of the present invention.

FIG. 2 is a block diagram showing an overview of a video content parsing system of the present invention. The system comprises a computer 202 containing Program for Interface block 210, Data Processing Modules, block 212 for carrying out the preferred embodiments of the present invention, and block 214 for logging the information associated with segment boundaries and key frames. Connected to the computer are: User Interface Devices 204, an optional Secondary Data Storage Devices 206 and an input Video Source 208. The input video data can be either analog or digital, compressed or uncompressed and can be on any type of storage medium. This system can also receive any type of video/TV/film standard.

PREFERRED EMBODIMENTS OF THE PRESENT INVENTION

A. First Embodiment of Invention

FIGS. 3A1, 3A2, and 3A3 show a flow chart for performing temporal segmentation capable of both detecting sharp cuts and gradual transitions implemented by special effects of the first embodiment of the present invention. This embodiment is different from the above described video segmentation algorithm of FIG. 1A. It detects sophisticated transition techniques including dissolve, wipe, fade-in, and fade-out by using a novel twin-comparison method to find the starting and ending points of the transitions. Prior art by Tonomura employed a histogram difference metric to calculate the difference value between frames and to detect a scene change whenever the result is greater than a specified threshold. In contrast, the present invention does not limit itself by the use of any particular difference metric and a single specified threshold. The novel twin-comparison method uses more than one threshold to detect both sharp camera breaks and gradual transitions. It introduces another diference comparison, namely, accumulated difference comparison as depicted in FIGS. 3A1, 3A2, and 3A3.

Refering again to FIGS. 3A1, 3A2, and 3A3, after initialization of system parameters at block 302, and loading in frame i (current frame) at block 304, the detection process begins to compare previous frame i-S and current frame i by calculating the difference, $D_i$, based on a selected difference metric at block 306. If $D_i$ is greater than a preselected shot break threshold, $T_b$, and Trans is false (that is, not in a transition period yet), then, it proceeds to block 308; otherwise, it goes to block 314. At block 308, if $\Sigma_F$, frame count in a shot, is not greater than $N_{smin}$, minimum number of frame for a shot, then it proceeds to block 315 where $\Sigma_F$ is incremented by S, a temporal skip factor between two frames being compared in the detection before continuing to process the remaining frames in the video sequence at block 336; otherwise a cut is declared at point P1 and a shot starting at frame $F_s$ and ending at frame $F_e$ is recorded at block 310 follow by reinitialization of the start of a new frame, reset frame count, $\Sigma_F$, to zero and set Trans to false at block 312 before proceeding to block 336. At block 314, $D_i$ is checked against a larger threshold $\alpha T_b$, where $\alpha$ is a user tunable parameter and is greater than 1. If $D_i$ is greater and Trans is true then a comfirmed cut is declared at point P1; otherwise, it proceeds to block 316. Here, if Trans is found to be false, that is, not in a transition period, $D_i$ is compared against a predefined transition break threshold, $T_t$, at block 330. If $D_i$ is greater than $T_t$ and the number of frame count in a shot, $\Sigma_F$, is greater than the minimum number of frame for a shot, $N_{smin}$, at block 332, a potential transition is found at P2 and Trans is set to true and other relevant parameters are updated at block 334 before proceeding to block 335. Otherwise, it goes to block 355 where $\Sigma_F$ is incremented by S before continuing to process the remaining frames in the video sequence. However, if, at block 316, Trans is true, that is, it is in a transition period, $D_i$ is further compared against $T_t$. If it is not lesser, then, $\Sigma_F$ (frame count in a shot), $\Sigma_{ta}$ (accumulative differences in a transition sequence) and $\Sigma_{tF}$ (frame count in a transition process) are updated at block 317 before continuing to process the remaining frames in the video sequence; otherwise, it proceeds to calculate $D_a$, the difference between current frame i and start frame of the potential transition, $F_p$, that is, between image feature of current frame, fi, and image feature of the potential transition frame, fp. At block 318, if $D_a$ is not greater than $T_b$ or $\Sigma_{ta}/\Sigma_{tF}$ is not greater then $\gamma T_t$ (where $\gamma \geq 1$) it goes to block 320; otherwise, the end of a transition has been successfully detected at point P3. Accordingly, a transition starting at $F_e=F_p$ and ending at $F_s$ is declared and recorded at block 322 before reinitializing relevant parameters at blocks 324 and 326 and then continues to process the next frame in the video sequence. At block 320, if the number of failed frame count for the period of transition, $\Sigma_{tm}$, is not less than the maximum allowable number of fails in a transition, $N_{tmmax}$, then the current transition is found to be false and deemed failed at block 328 at point P4; otherwise, $\Sigma_{tm}$, $\Sigma_{ta}$ and $\Sigma_{tF}$ are updated, that is, still in transition period, before proceeding to block 336. Here, the position of the current frame is incremented by a pre-defined skip factor, S, the start of the next frame for processing; and if it has not reached the end of the frame in the sequence, then it repeats the process from block 304.

Figure 3B:
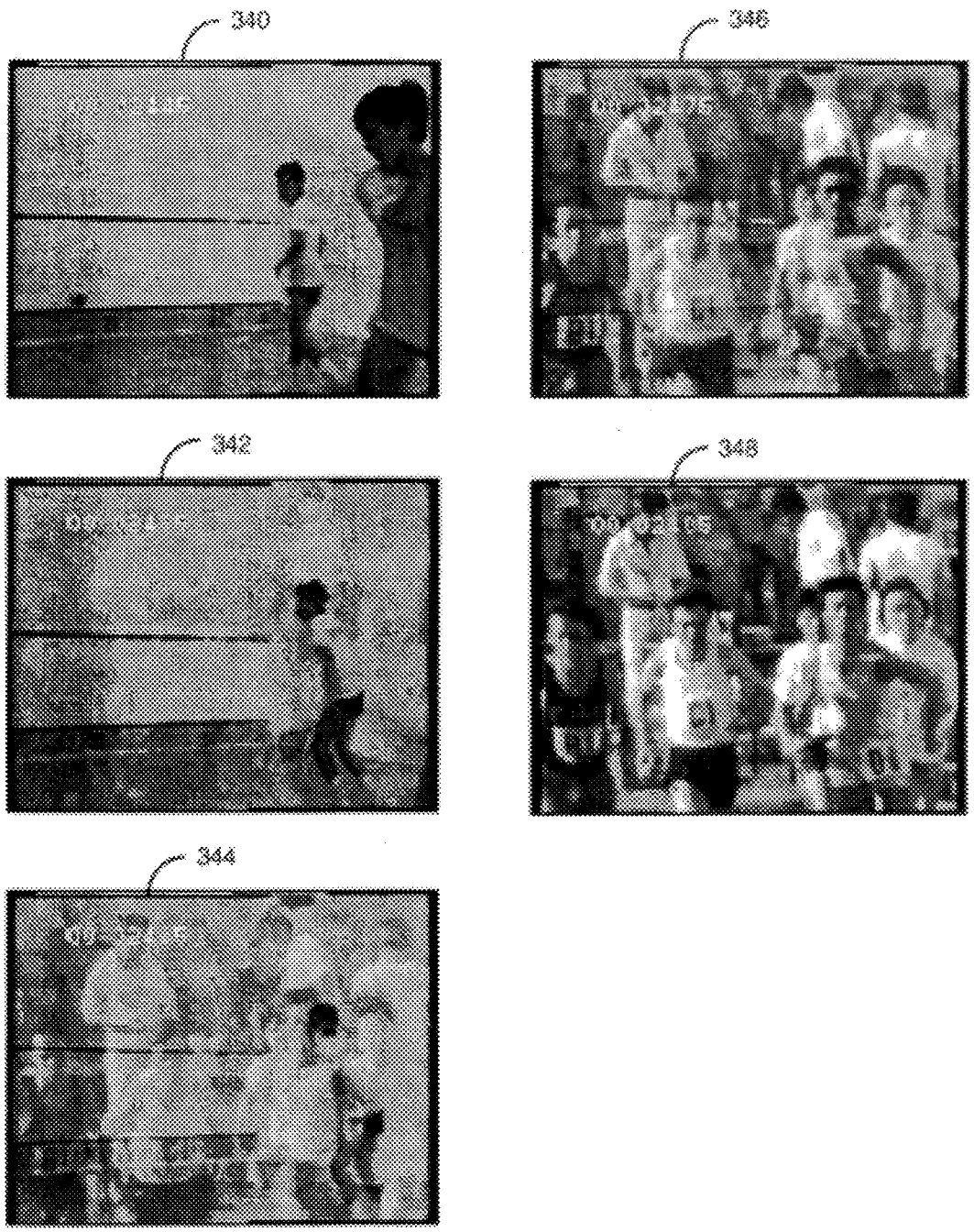
FIG. 3B shows an example of a typical dissolve transition found in a video sequence.
Figure 3C:
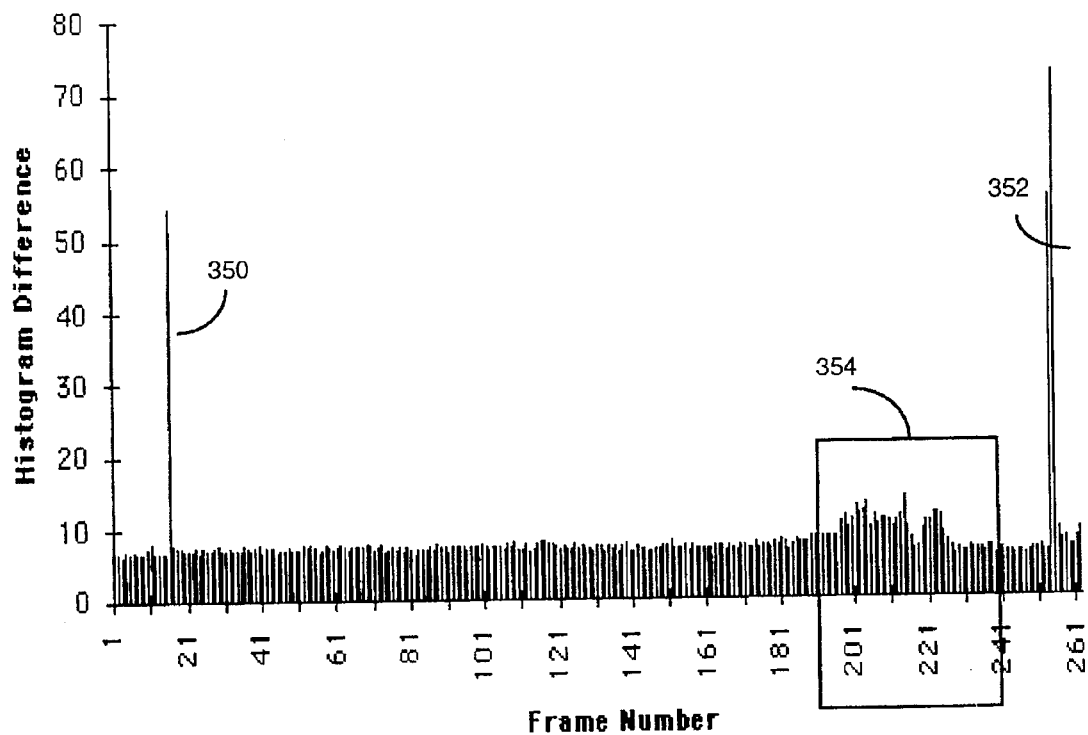
FIG. 3C shows an example of the frame-to-frame difference values with high peaks corresponding to sharp cuts and a sequence of medium peaks corresponding to a typical dissolve sequence.
Figure 3D:
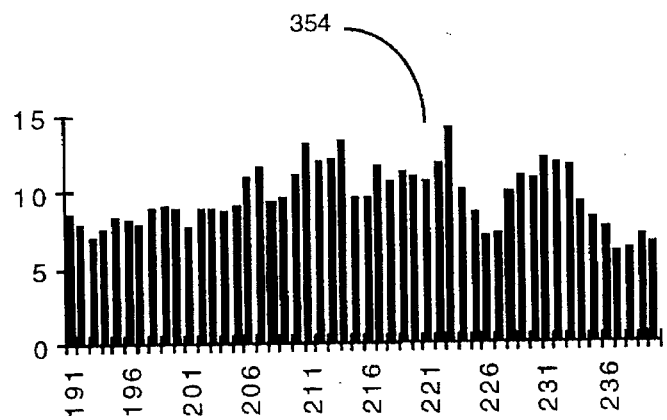

The flow chart as depicted in FIGS. 3A1, 3A2 and 3A3 is capable of detecting gradual transitions such as a dissolve as shown in FIG. 3B. The original scene 340 is slowly being superimposed by another scene at 342, 344 and 346 and finally fully dominated by that new scene 348. Effectively, the task of the algorithm as described above is to detect these first and last frames of the transition sequences in a video sequence. FIG. 3C depicts an example of the frame-to-frame difference values, showing high peaks corresponding to sharp cuts at 350 and 352; and a sequence of medium peaks corresponding to a typical dissolve sequence 354.

A single-pass approach depicted in FIGS. 3A1, 3A2, and 3A3 has the disadvantage of not exploiting any information other than the threshold values, thus, this approach depends heavily on the selection of those values. Also, the processing speed is slow. A straightforward approach to reducing processing time is to lower the resolution of the comparison, that is, examining only a subset of the total number of pixels in each frame. However, this is clearly risky, since if the subset is too small, the loss of spatial detail (if examining in spatial domain) may result in a failure to detect certain segment boundaries. A further improvement could be achieved by employing a novel multiple-pass approach to provide both high speed processing, the amount of improvement depending on the size of the skip factor and the number of passes, and accuracy of the same order in detecting segment boundaries. In the first pass, resolution is scarified temporally to detect potential segment boundaries with high speed. That is, a "skip factor", S, in the video segmentation process is introduced. The larger the skip factor, the lower the resolution. (Note that this skip factor is in general larger than the one used in the description of the above and below flow charts.) For instance, a skip factor of 10 means examining only one out of 10 frames from the input video sequence, hence reducing the number of comparisons (and, therefore, the associated processing time) by the same factor. In this process twin comparison for gradual transitions as described in FIGS. 3A1, 3A2, and 3A3 is not applied. Instead, a lower value of $T_b$ is used; and all frames having a difference larger than $T_b$ are detected as potential segment boundary. Due to the lower threshold and large skip factor, both camera breaks and gradual transitions, as well as some artifacts due to camera or object movement, will be detected. False detections fall under the threshold will also be admitted, as long as no real boundaries are missed. In the second pass, all computations are restricted to the vicinity of these potential boundaries and the twin-comparison is applied. Increased temporal (and spatial) resolution is used to locate all boundaries (both camera breaks and gradual transitions) more accurately, thus recovers the drawback of the low accuracy of locating the potential shot boundaries resulting from the first pass. Another feature can be implemented in the multiple-pass method is that there is an option whereby different difference metrics may be applied in different passes to increase confidence in the results.

B. Second Embodiment of Invention

The second embodiment of the present invention pertains to the determination of the threshold values used for determining segment boundaries, in particular thresholds $T_b$, the shot break threshold, and $T_t$, the transition break threshold. It is of utmost importance when selecting these threshold values because it has been shown that they vary from one video source to another. A "tight" threshold makes it difficult for false transitions to be falsely accepted by the system, but at the risk of falsely rejecting true transitions. Conversely, a "loose" threshold enables transitions to be accepted consistently, but at the risk of falsely accepting false transitions.

In this invention, the automatic selection of threshold $T_b$ is based on statistics of frame-to-frame differences over an entire or part of a given video sequence. Assuming that there is no camera shot change or camera movement in a video sequence, the frame-to-frame difference value can only be due to three sources of noise: noise from digitizing the original analog video signal, noise introduced by video production equipment, and noise resulting from the physical fact that few objects remain perfectly still. All three sources of noise may be assumed to be random. Thus, the distribution of frame-to-frame differences can be decomposed into a sum of two parts: the random noises and the differences introduced by shot cut and gradual transitions. Differences due to noise do not relate to transitions. So $T_b$ is defined as $T_b=\mu+a\sigma$ where $\sigma$ is the standard deviation, $\mu$ is the mean difference from frame to frame and a is a tunable parameter and a>2. The other threshold, namely, $T_t$, is used for detecting gradual transition and is defined as $T_t=bT_b$ where b is between 0.1 to 0.5; according to experiments conducted.

C. Third Embodiment of Invention

Figure 4:
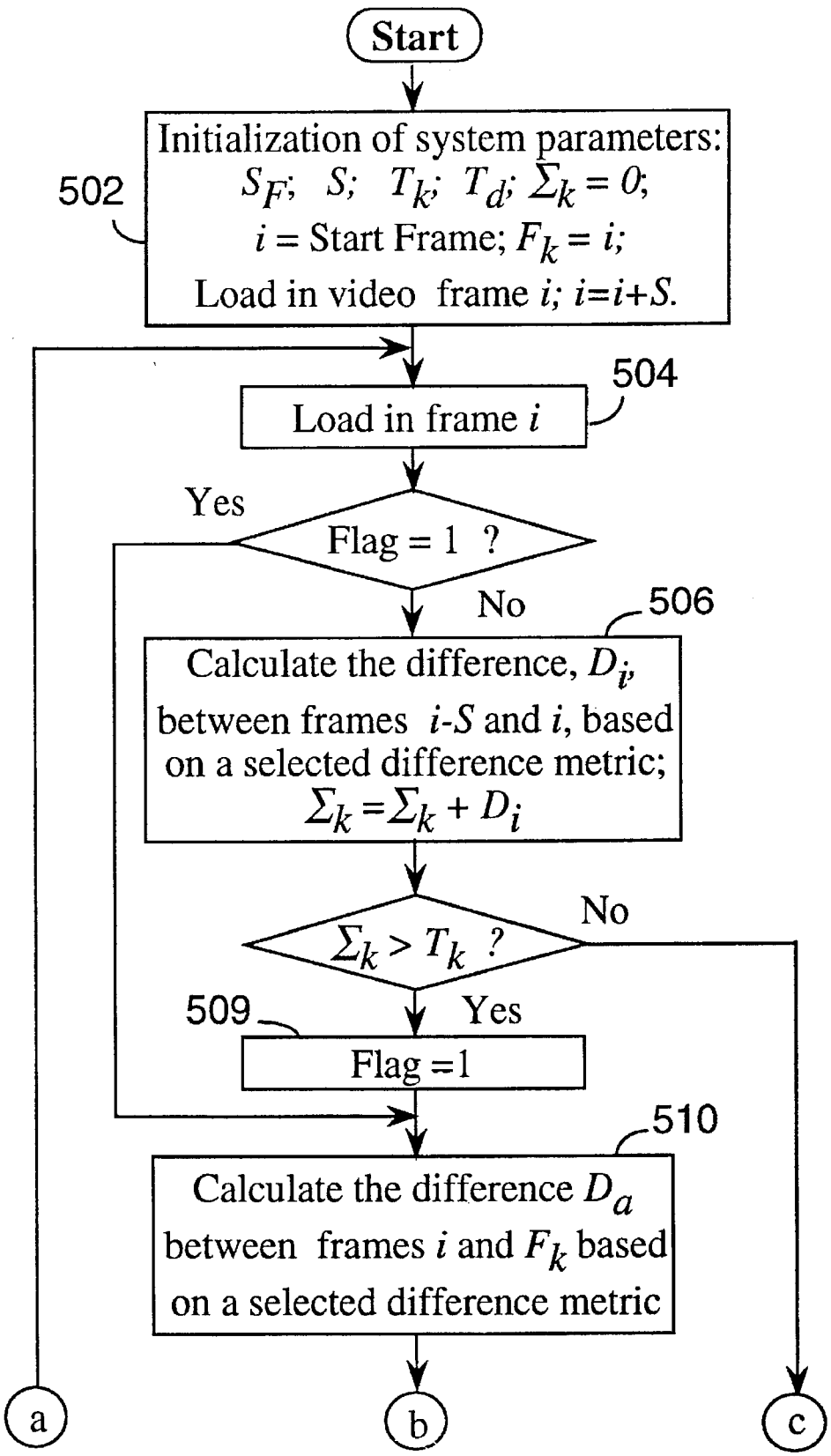
FIG. 4 shows a flow chart for extracting key frame of the present invention.
Figure 4A:
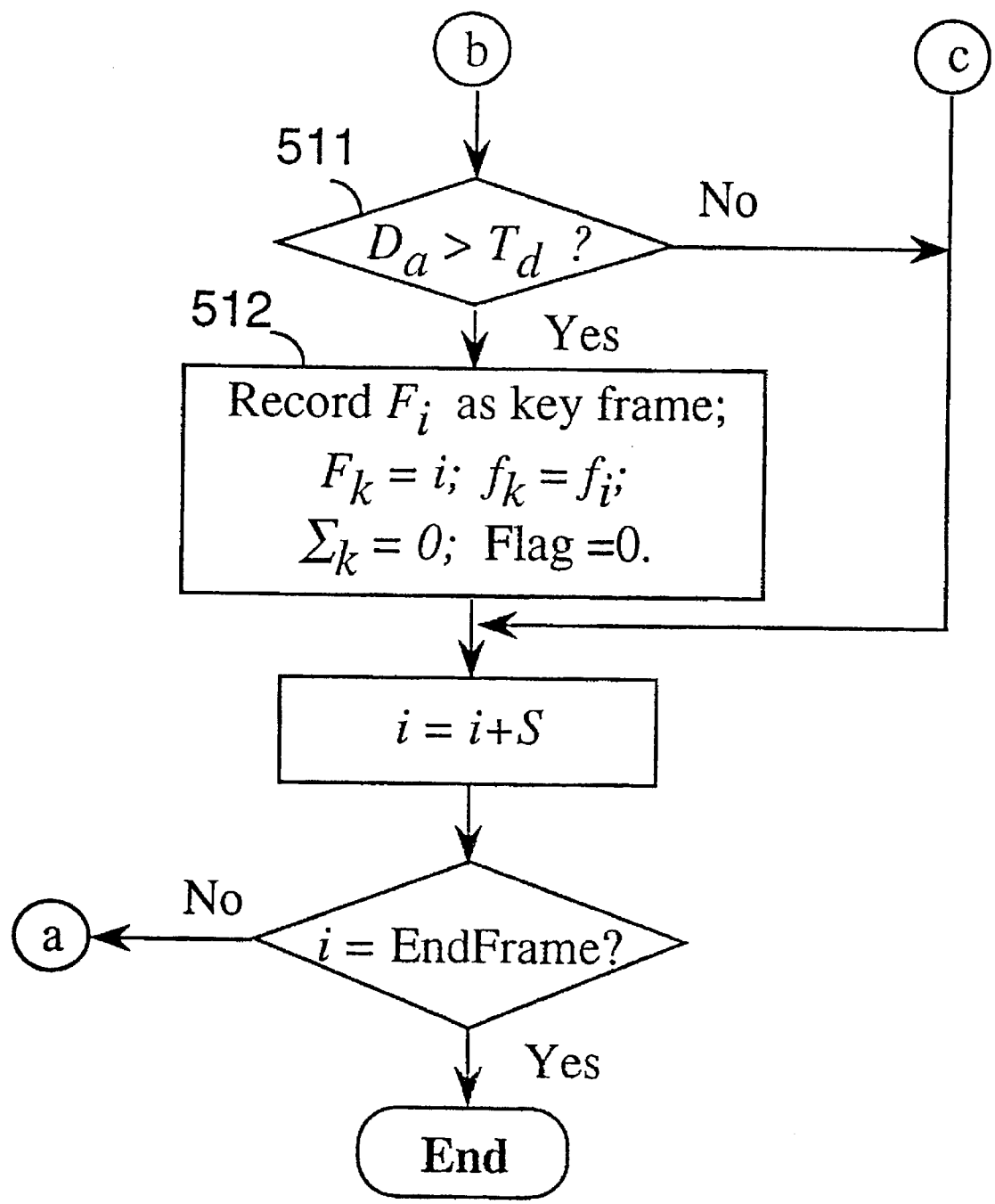
FIG. 4A is a continuation of the flow chart in FIG. 4.
Figure 5:
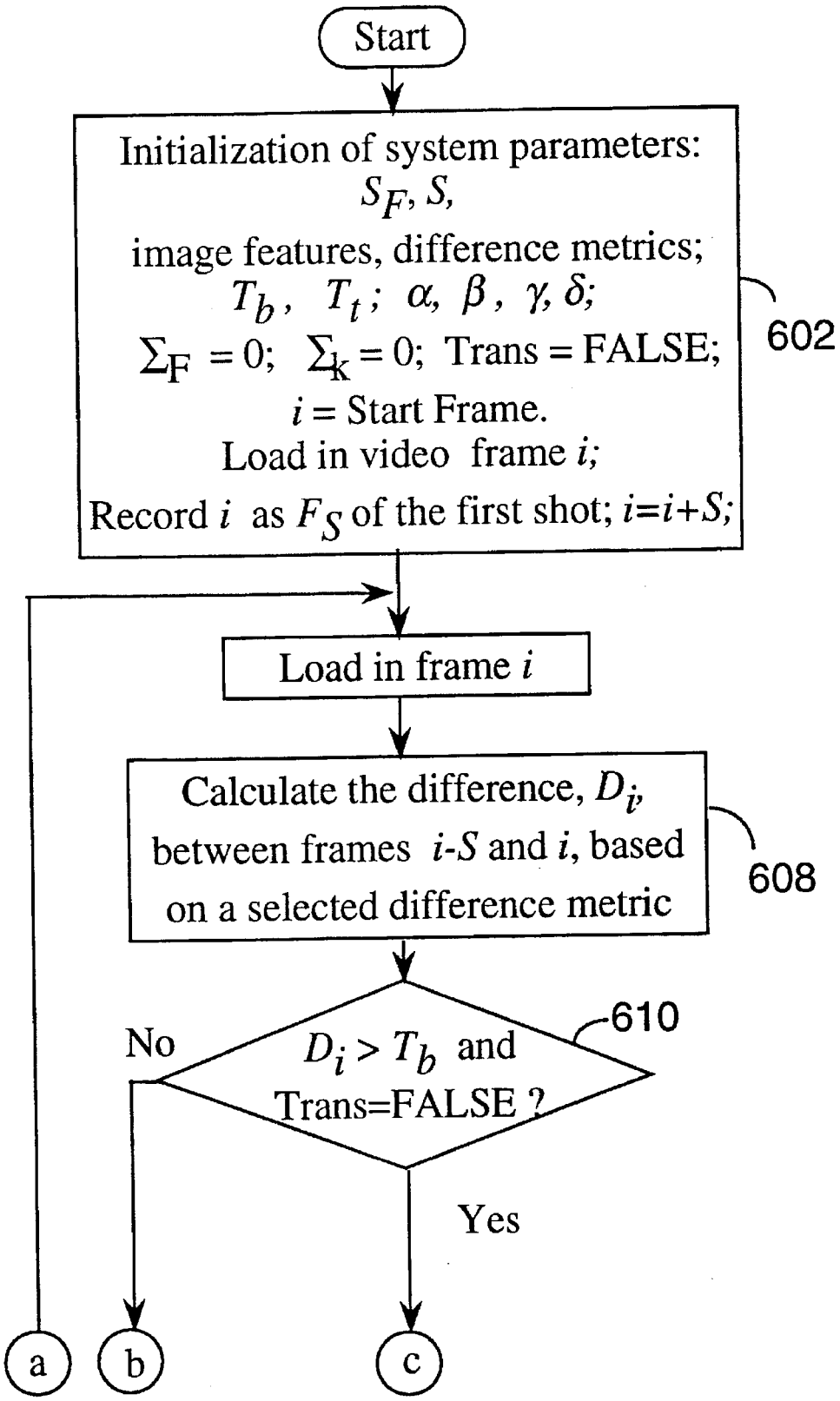
FIG. 5 shows a flow chart of a system for automatically segmenting video and extracting key frame according to the video parser in FIG. 2.
Figure 5A:
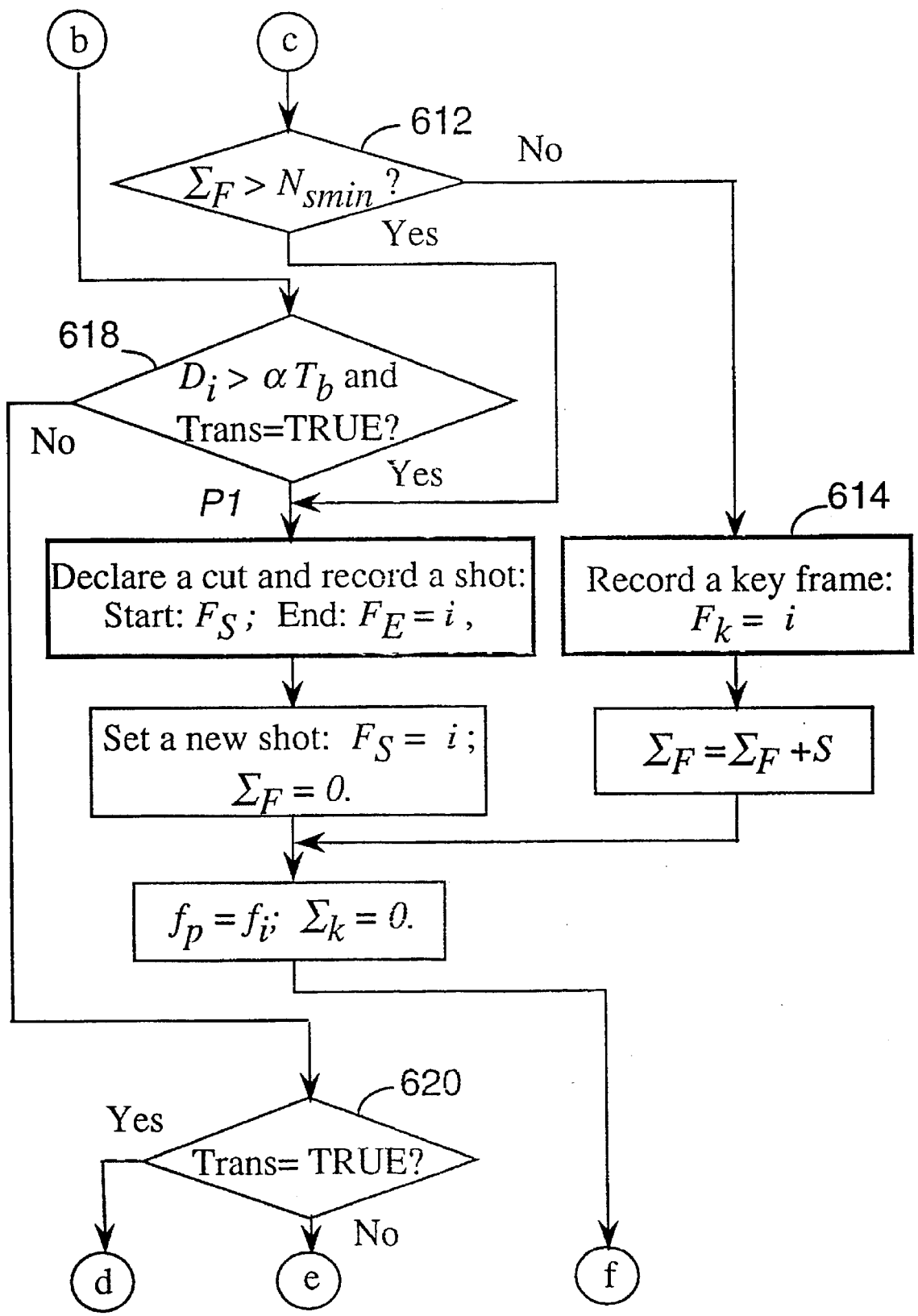
FIG. 5A is a continuation of the flow chart in FIG. 5.
Figure 5B:
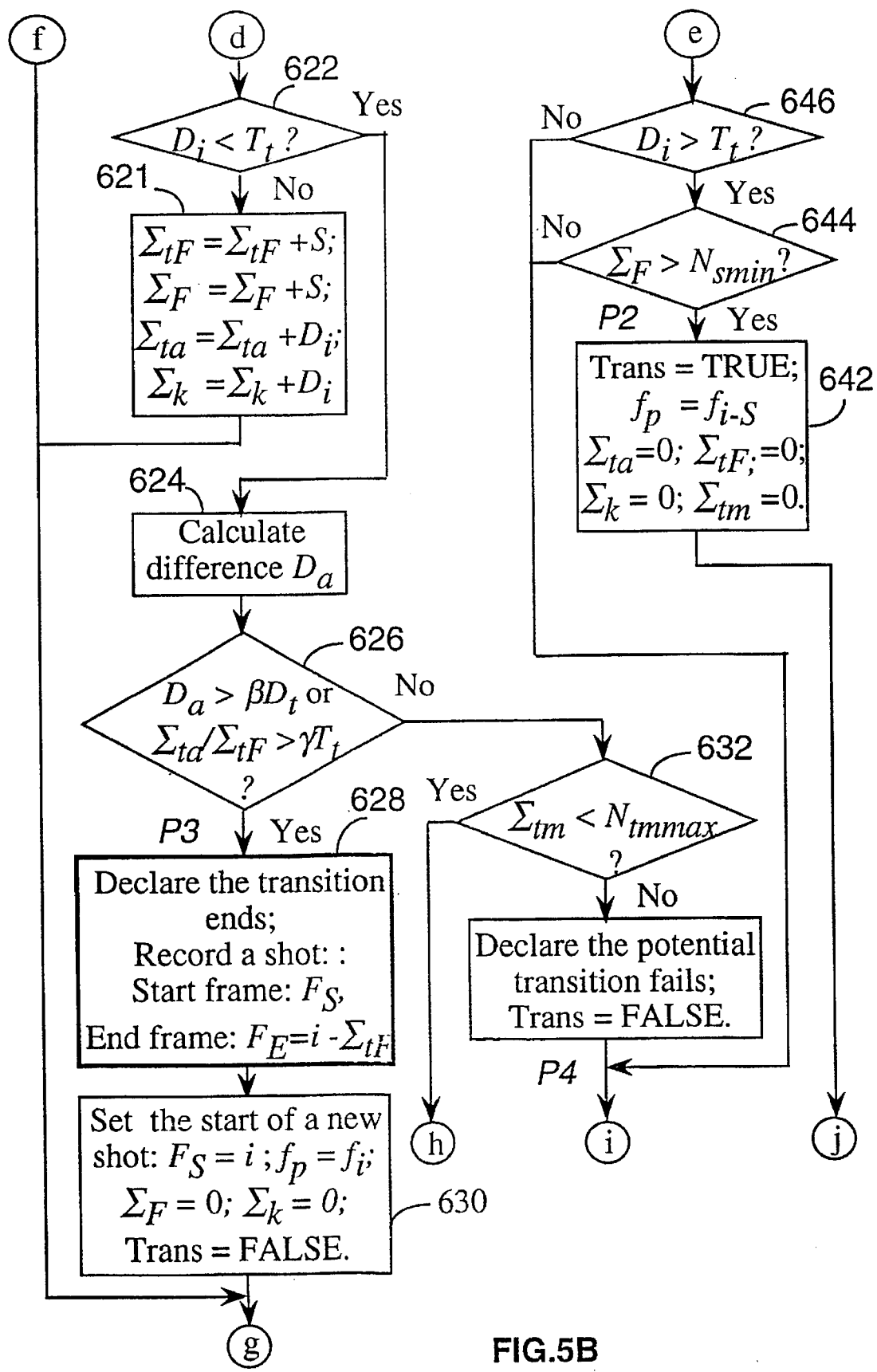
FIG. 5B is a continuation of the flow chart in FIG. 5A.
Figure 5C:
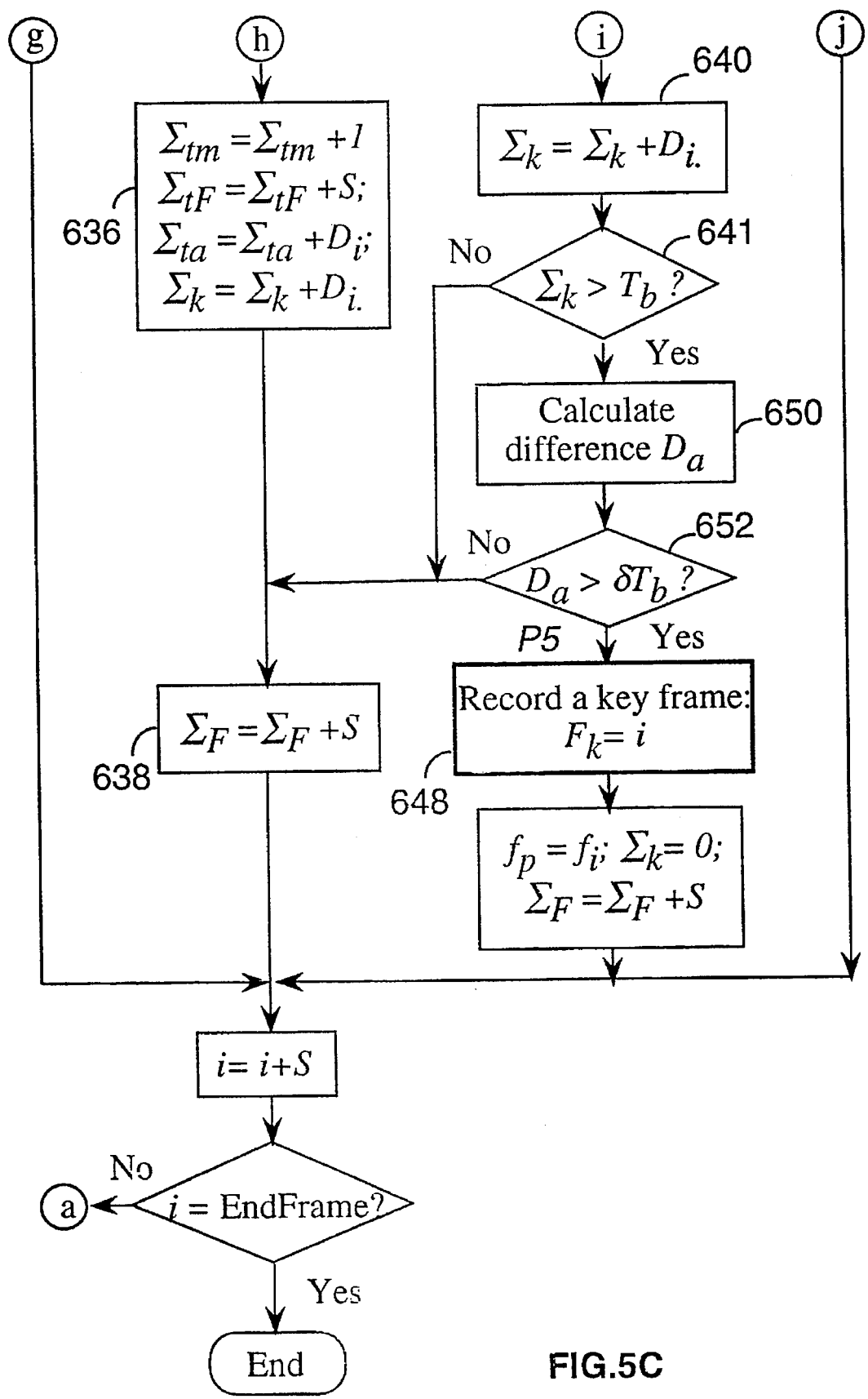
FIG. 5C is a continuation of the flow chart in FIG. 5B.

FIGS. 4 and 4A depict the third embodiment of the present invention, an automatic content based key frame extraction method using temporal variation of video content. After initializing system parameters at block 502, the difference, $D_i$, between frames i-S and i is calculated and accumulated based on a selected difference metric at block 506. If this accumulated difference, $\Sigma_k$, exceeds $T_k$, threshold for potential key frame, then, it sets the Flag to 1, a potential key frame has been detected, at block 509 and proceeds to block 510, where further verification is made by calculating $D_a$, the difference between current frame i and last key frame recorded, $F_k$, based on a selected difference metric. If, at block 511, $D_a$ is greater than $T_d$, threshold for key frame, then, at block 512, the current frame, $F_i$, is recorded as a current key frame and reinitialization of $F_k$ as current frame, $\Sigma_k$ to zero, and fk, image feature of previous key frame, as current image feature is carried out before repeating the process again from block 504 if the end of the frame of the video sequence has not been reached. Otherwise, if, at block 511, $D_a$ is not greater than $T_d$, then, it proceeds to analyze the next frame.

The key frame extaction method as described in FIG. 4 is different from prior art. Prior art uses motion analysis which heavily depends on tracing the positions and sizes of the objects being investigated using mathematical functions to extract a key frame. This method is not only too slow but also impractical since it relies on accurate motion field detection and complicated image warping. Whereas the present invention extracts key frames purely based on the temporal variation of the video content as described in FIGS. 4 and 4A. These key frames can then be used in video content indexing and retrieval.

OPERATION OF THE PREFERRED EMBODIMENTS

FIGS. 5, 5A, 5B and 5C show a flow chart of an operation of the preferred embodiments for a video parser of FIG. 2. After selecting the difference metric(s) and therefore the image feature(s) to be used in frame content comparison, by user or by default, as well as all the required system parameters at block 602, the system loads in a video sequence into the parser, and digitizes it if it has not been done so. Then, the difference, $D_i$, between consecutive video frames is calculated based on the selected difference metric (s) at block 608. If $D_i$ exceeds the shot break threshold, $T_b$, and Trans is false (that is, not in a transition period) and the number of frame count in a shot, $\Sigma_F$, is greater than the minimum preset number of frames for a shot, $N_{smin}$, a cut is declared at point P1 and a shot, starting at frame $F_s$ and ending at frame $F_e$, is recorded; and the detection process continues to process the following frames of the video sequence. However, if, at block 612, $\Sigma_F$ is not greater than $N_{smin}$, then, a key frame is recorded at block 614. At block 610, if the conditions are not true and at block 618, the conditions are still not true, then, further check is required at block 620. At this check, if Trans is not true and at block 646, $D_i$ is not greater than $T_t$, then, it proceeds to block 640 where $\Sigma_k$, the sum of accumulative differences after previous key frame, is incremented by $D_i$ and proceeds to block 641. Here, if the sum of accumulative differences is not greater than $T_k$, it goes to block 638; otherwise it proceeds to block 650 to calculate $D_a$, the difference between feature $f_i$ and $f_p$. If, at block 644, the number of frame count in a shot, $\Sigma_F$, is greater than the minimum number of frame allowable for a single shot, $N_{smin}$, a potential transition is found at P2 and accordingly Trans is set to true and other relevant parameters are updated at block 642; otherwise, it proceeds to block 640. Coming back to block 652, if $D_a$ is greater than $\delta T_b$, a key frame is detected at point P5 and appropriately recorded at block 648; otherwise, it proceeds to block 638 where $\Sigma_F$ is incremented by S before continuing to process the remaining frames in the video sequence. However, if, at block 620, Trans is true, that is, it is in a potential transition phase; and, at block 622, $D_i$ is less than transition break threshold, $T_t$, a further distinction is achieved by calculating, $D_a$, the difference between the current feature, fi, and previous feature, fp, at block 624. At block 626, if $D_a$ is greater than $\beta D_i$ (where $\beta \geq 2$) or the average of $D_i$ between the frames in the potential transition, $\Sigma_{ta}/\Sigma_{tF}$, is greater than $\gamma T_t$ (where $\gamma \geq 1$), then, a transition is confirmed at point P3. A shot starting at frame $F_s$ and ending at frame $F_e$ ($=i-\Sigma_{tF}$) is recorded at block 628 before reinitialization of the relevant parameters at block 630. However, if, at block 626, the conditions are not true and at block 632, the number of failed frame count, $\Sigma_{mn}$, is not less than the maximum allowable number of fails in a transition, $N_{tmmax}$, then, a false transition is declared at point P4 and accordingly, Trans is set to false before proceeding to block 640. At block 632, however, if the condition is satisfied, it proceeds to blocks 636 and 638 where the parameters are adjusted accordingly before it continues to process the next frames within the video sequence. At block 622, if the condition is not met, it proceeds to block 621 where concerned parameters are adjusted accordingly before proceeding to process the following frames in the video sequence. The output data contains the frame numbers and/or time codes of the starting and ending frames as well as key frames of each shot.

While the present invention has been described particularly with reference to FIGS. 1 to 5C, it should be understood that the figures are for illustration only and should not be taken as limitations on the invention. In addition, it is clear that the methods of the present invention have utility in many applications where analysis of image information is required. It is contemplated that many changes and modifications may be made by one of ordinary skill in the art without departing from the spirit and the scope of the invention as described.

We claim:

1. In a system for parsing a plurality of images in motion without modifying a media in which the images are recorded originally, said images being further divided into plurality sequences of frames, a method for selecting at least one key frame representative of a sequence of said images comprising the steps of:

(a) determining a difference metric or a set of difference metrics between consecutive image frames, said difference metrics having corresponding thresholds for selected image features;

(b) deriving a content difference (Di), said $D_i$ being a difference between two current image frames based on said selected image features and said difference metrics, an interval between said two current image frames being adjustable with a skip factor S which defines a resolution at which said image frames are being analyzed;

(c) accumulating $D_i$ between every two said consecutive frames until a sum thereof exceeds a predetermined potential key frame threshold $T_k$;

(d) calculating a difference $D_a$, said $D_a$ being a difference between the current frame and the previous key frame based on said difference metrics, or between the current frame and the first frame of said sequence based also on said difference metric if there is no previous key frame, the current frame becoming the key frame if $D_a$ exceeds a predetermined key frame threshold $T_d$; and (e) repeating the steps (a) to (d) until the end frame is reached, whereby key frames for indexing sequences of image are identified and captured automatically.

2. The key frame selection method in claim 1 wherein said potential key threshold $T_k$ is selected to be equal to or larger than a shot break threshold $T_b$.

3. The key frame selection method in claim 1 wherein said key frame threshold $T_d$ is selected to be proportional to but smaller than a shot break threshold $T_b$.

4. In a system for parsing a plurality of images in motion without modifying a media in which the images are recorded originally, said images being further divided into plurality of sequences of frames, a method for segmenting at least one sequence of said images into individual camera shots, said method comprising the steps of:

(a) determining a difference metric or a set of difference metrics between consecutive image frames, said difference metrics having corresponding shot break thresholds $T_b$ for selected image features;

(b) deriving a content difference $D_i$, said $D_i$ being a difference between two current image frames based on said selected image features and said difference metrics, an interval between said two current image frames being adjustable with a skip factor S which defines a resolution at which said image frames are being analyzed;

(c) declaring a sharp cut if $D_i$ exceeds said threshold $T_b$;

(d) detecting a starting frame of a potential transition if said $D_i$ exceeds a transition threshold $T_t$ but is less than said shot break threshold $T_b$;

(e) detecting an end frame of a potential transition by verifying that $D_a > T_b$ or $\Sigma_{ta}/\Sigma_{tF} > \gamma T_t$ is true; and (f) continuing steps (a) through (e) until the end frame is reached, whereby sequence of images having individual camera shots are identified and segmented automatically in at least one pass.

5. The method for video segmentation as in claim 4 wherein said shot break threshold $T_b$ is a sum of a mean of the frame-to-frame difference $\mu$ and a multiple a of a standard deviation of a frame-to-frame difference $\sigma$.

6. The method for video segmentation as in claim 5 wherein said a has a value between 5 and 6 when the difference metric is a histrogram comparison.

7. The method for video segmentation as in claim 4 wherein said transition threshold $T_t$ a multiple b of said shot break threshold $T_b$.

8. The method for video segmentation as in claim 7 wherein said b has a value between 0.1 and 0.5.

9. The method for video segmentation as in claim 4 wherein the ending of transition is confirmed if:

(a) $D_i$ is less than the transition threshold $T_t$; and (b) the accumulated $D_i$ between the starting frame of a potential transition and the current frame exceeds the threshold $T_b$, or the average $D_i$ between two consecutive frames in the transition is higher than a multiple $\beta$ of the threshold $T_t$.

10. The method for video segmentation as in claim 9 wherein said $\beta$ is larger than 1.0.

11. The method for video segmentation as in claim 9 wherein the ending of transition is confirmed notwithstanding a failure to comply with steps (a) and (b) if a number of consecutive frames between every two of $D_i$ is lower than the threshold $T_t$ consistently, said number of consecutive frames being allowed in a transition up to a user-turnable tolerance before the potential transition is determined as false and is discarded.

12. The method for video segmentation as in claim 11 wherein the user-tunable tolerance is larger than three frames if the frame sequence is sampled with skip factor S=1, $N_{tmmax}$ being greater than or equal to 3.

13. The method for video segmentation as in claim 4 wherein the starting of frame of a potential transition is set only if a number of frames of the current shot is larger than a default number $N_{smin}$; said default number $N_{smin}$ typically being greater than or equal to 5.

14. The method of video segmentation as in claim 4 wherein a processing speed of steps (a) through (f) is enhanced, said method comprising at least two steps of:

(a) choosing in a first pass a skip factor S larger than 2 to temporarily decrease resolution, so as to identify rapidly a location of potential segment boundaries without allowing any real boundaries to pass through without being detected; and (b) increasing resolution and restricting all computation to a vicinity of said potential segment boundaries whereby both camera breaks and gradual transitions are further identified, said step (b) being applied to subsequent passes.

15. The method for video segmentation as in claim 14 wherein said method employs different difference metrics in different passes.

16. A speed-enhanced multi-pass method for segmenting at least one sequence of images into individual camera shots in a system for parsing a plurality of said images in motion without modifying a media in which said images are recorded originally, said images being further divided into plurality of sequences of frames, said method comprising the steps of:

(a) determining a difference metric or a set of difference metric between consecutive image frames, said difference metrics having corresponding shot break thresholds $T_b$ for selected image features;

(b) deriving a content difference $D_i$, said $D_i$ being a difference between two current image frames based on said selected image features and said difference metrics, an interval between said two current image frames being adjustable with a skip factor S which defines a resolution at which said image frames are being analyzed:

(c) declaring a sharp cut if $D_i$ exceeds said threshold $T_b$; and (d) continuing steps (a) through (c) until the end frame is reached, whereby in a first pass, resolution is temporarily decreased by choosing a skip factor S larger than 2, so as to identify rapidly a location of potential segment boundaries without allowing any real boundaries to pass through without being detected, and in subsequent passes, resolution is increased and all computation is restricted to a vicinity of said potential segment boundaries whereby both camera breaks and gradual transitions are further identified.

17. The method for video segmentation as in claim 14 wherein said increasing step further includes:

(a) determining a difference metric or a set of difference metrics between consecutive image frames, said difference metrics having corresponding shot break thresholds $T_b$ for selected image features;

(b) deriving a content difference $D_i$, said $D_i$ being a difference between two current image frames based on said selected image features and said difference metrics, an interval between said two current image frames being adjustable with a skip factor S which defines a resolution at which said image frames are being analyzed:

(c) declaring a sharp cut if $D_i$ exceeds said threshold $T_b$;

(d) detecting a starting frame of a potential transition if said $D_i$ exceeds a transition threshold $T_t$ but less than said shot break threshold $T_b$;

(e) detecting an ending frame of a potential transition by verifying an accumulated difference, said accumulated difference being based on said selected difference metrics; and (f) continuing steps (a) through (e) until the end frame is reached, whereby said steps (a) through (f) are applied for said subsequent passes.

18. In a system for parsing a plurality of images in motion without modifying the media in which the images are recorded originally, said images being further divided into plurality of sequences of frames, a method for segmenting at least one sequence of said images into individual camera shots and selecting at least one key frame representative of a sequence of said images, said method comprising the steps of:

(a) determining a difference metric or a set of difference metrics between consecutive image frames, said difference metrics having corresponding shot break thresholds $T_b$ for selected image features;

(b) deriving a content difference $D_i$, said $D_i$ being the difference between two current image frames based on said selected image features and said difference metrics, the interval between said two current image frames being adjustable with a skip factor S which defines the resolution at which said image frames are being analyzed;

(c) declaring a sharp cut if $D_i$ exceeds said threshold $T_b$;

(d) detecting the starting frame of a potential transition if said $D_i$ exceeds a transition threshold $T_t$ but less than said shot break threshold $T_b$;

(e) detecting the ending frame of a potential transition by verifying an accumulated difference, said accumulated difference being based on said selected difference metrics;

(f) accumulating $D_i$ between every two said consecutive frames until a sum thereof exceeds a predetermined potential key frame threshold $T_k$.a (g) calculating a difference Da, said Da being a difference between the current frame and the previous key frame based on said difference metric, or between the current frame and the first frame of said sequence based also on said difference metric if there is no previous key frame, the current frame becoming the key frame if Da exceeds a predetermined key frame threshold $T_d$; and (h) continuing the steps (a) through (g) until the end frame is reached, whereby sequence of images having individual camera shots are identified and segmented automatically and key frames for indexing sequences of image are identified and captured in at least one pass.

19. The method for video segmentation as in claim 18 wherein said shot break threshold $T_b$ is a sum of a mean of a frame-to-frame difference $\mu$ and a multiple a of a standard deviation of the frame-to-frame difference $\sigma$.

20. The method for video segmentation as in claim 19 wherein said a has a value between 5 and 6 when the difference metric is a histrogram comparison.

21. The method for video segmentation as in claim 18 wherein said transition threshold $T_t$ is a multiple b of said shot break threshold $T_b$.

22. The method for video segmentation as in claim 21 wherein said b has a value between 0.1 and 0.5.

23. The method for video segmentation as in claim 18 wherein the ending of transition is confirmed if:

(a) $D_i$ is less than the transition threshold $T_t$; and (b) the accumulated $D_i$ between the starting frame of a potential transition and the current frame exceeds the threshold $T_b$ or the average $D_i$ between two consecutive frames in the transition is higher than a multiple $\beta$ of the threshold $T_t$.

24. The method for video segmentation as in claim 23 wherein said $\beta$ is larger than 1.0.

25. The method for video segmentation as in claim 23 wherein the ending of transition is confirmed notwithstanding a failure to comply with steps (a) and (b) if a number of consecutive frames between every two of $D_i$ is lower than the threshold $T_t$ consistently, said number of consecutive frames being allowed in a transition up to a user-tunable tolerance before the potential transition is determined as false and is discarded.

26. The method for video segmentation as in claim 25 wherein the user-tunable tolerance is larger than three frames if the frame sequence is sampled with skip factor S=1, $N_{tnmax}$ being greater than or equal to 3.

27. The method for video segmentation as in claim 18 wherein the starting of frame of a potential transition is set only if a number of frames of the current shot is larger than a default number; said default number typically being 5 frames, and $N_{smin}$ being greater than or equal to 5.

28. The key frame selection method in claim 18 wherein said potential key threshold $T_k$ is selected to be equal to or larger than the shot break threshold $T_b$.

29. The key frame selection method in claim 18 wherein said key frame threshold $T_d$ is selected to be proportional to but smaller than the shot break threshold $T_b$.

* * * * *